United States Patent Office 2,905,679
Patented Sept. 22, 1959

2,905,679
PROCESS FOR THE PREPARATION OF BETA-OXONITRILES

John A. Brockman, Jr., Woodcliff Lake, N.J., and Paul F. Fabio, Pearl River, N.Y., assignors to American Cyanamid Company, New York, N.Y., a corporation of Maine No Drawing. Application March 4, 1958
Serial No. 718,964

7 Claims. (Cl. 260—404)

This invention relates to a new method of preparing beta-oxonitriles.

Beta-oxonitriles are a well-known class of compounds having a number of uses, particularly as intermediates in the preparation of other organic compounds. Several methods of preparing beta-oxonitriles have been described in the scientific and patent literature. Generally speaking, these methods have disadvantages of one kind or another which are avoided by the process of the present invention. Although the chemical reactions which are involved are numerous and highly complex, yet the method that will be described herein is comparatively simple, being what is often referred to as a "shot gun" reaction, wherein the several numerous individual reactions necessary to obtain the final product take place consecutively in a single reaction vessel without the necessity of isolating the intermediate products.

The production of beta-oxonitriles from known starting materials may be illustrated by means of a series of equations which follow. The first step involves the reaction of an ester of cyanoacetic acid with an alkali metal hydride or alkoxide to form an alkali metal salt of the cyanoacetic ester. This may be illustrated by the following equation:

(I)
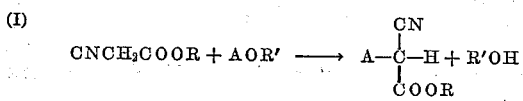

In the above equation, R is preferably a tertiary butyl radical, although other esters of cyanoacetic acid with other tertiary alcohols could be used. R' is also preferably a tertiary butyl radical; but it, too, could be another tertiary alkyl radical. The symbol A represents an alkali metal radical, preferably lithium; but it could be sodium, potassium, rubidium, or cesium. Although the above equation shows the use of an alkali metal alkoxide to form an alkali metal salt of the cyanoacetic ester, alkali metal hydrides may be used in lieu thereof. Since the formation of alkali metal salts of related compounds with alkali metal hydrides is known to chemists skilled in the art, a detailed discussion of this alternative procedure would appear to be unnecessary.

The second step in the reaction is presumed to be that illustrated by the following equation:

(II)
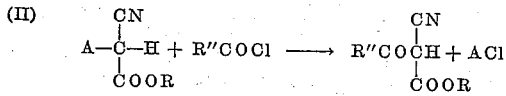

In the above equation, R'' is an aromatic or aliphatic radical, the choice depending upon what particular beta-oxonitrile is desired as a final product. As will be seen, the alkali metal group A is replaced by the acyl radical with the formation of an alkali metal halide as by-product.

The third stage of the reaction is illustrated by the following:

(III)
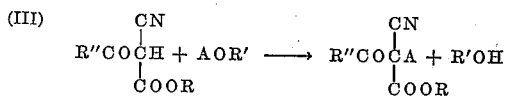

As will be seen, the alkali metal alkoxide (or hydride, if such is used) which is the same as that used in Equation I results in the replacement of the hydrogen on the beta-carbon of the intermediate and formation of an alkali metal salt thereof.

Several different transformations then take place which may be shown by the following equation:

(IV)
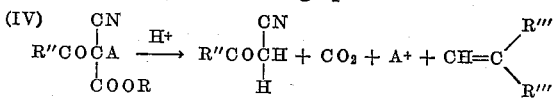

In the above, R''' represents methyl radicals when the starting material is a tertiary butyl ester of cyanoacetic acid. In this last step, a strong anhydrous acid is used being represented by the symbol H+ and heat is applied. This decomposes the intermediate by replacing the alkali metal radical A, splitting off the group R as isobutylene, and decarboxylating the residue with the formation of carbon dioxide. Decarboxylation is favored by heating to 100° C. or higher. The reaction may be considered complete when no more carbon dioxide comes off.

While a multiplicity of different chemical reactions appears to be taking place as indicated above, actually in practicing the present invention these several reactions take place consecutively in the reaction vessel whereby the desired beta-oxonitrile is formed in one relatively simple operation.

More specifically, a preferred embodiment of the process of the present invention which results in the formation of benzoylacetonitrile is illustrated in the following example.

Example 1

A 2-liter, three-necked flask was equipped with a Dry Ice condenser, a magnetic stirrer, an immersion thermometer and a 250-milliliter addition funnel connected to a gas inlet tube to which was fitted a Dry Ice condenser. To a cooled and stirred mixture of 170 grams (2.0 mol) of cyanoacetic acid, 200 milliliters of dry ether and 63 milliliters of boron trifluoride ether complex (Eastman) in the reaction flask was added, in three minutes, 200 milliliters of liquid isobutylene previously condensed in the addition funnel. The addition funnel and gas inlet tube were removed and the flask was fitted with the two Dry Ice condensers and the thermometer. The reaction mixture was stirred at 0–5° C. for six hours after which it was poured into a solution of 346 grams (2.5 mols) of potassium carbonate in 500 grams of water and ice. The two liquid phases were separated. The ether layer was washed with dilute potassium carbonate, dried over anhydrous potassium carbonate and stripped of ether. The oily residue was distilled through a 30-centimeter Vigreux column to give 176.4 grams (62.5 percent) of tert-butyl cyanoacetate boiling at 92–94° C. at 9.8–10.3 millimeters and having $N_D^{20}$ 1.4198.

A solution of lithium tert-butoxide was prepared by dissolving 1.39 grams (0.20 gram atom) of lithium metal wire cut into small pieces in a mixture of 20.8 milliliters (0.22 mol) of tert-butyl alcohol and 150 milliliters of toluene at reflux. About two and a half hours were required. While still hot, this solution was added with vigorous stirring, in ten minutes, to a solution of 11.6 milliliters (0.10 mol) of benzoylchloride and 16.2 grams (0.115 mol) of tert-butyl cyanoacetate in 50 milliliters of toluene cooled to −60 to −40° C. in a 250-milliliter, three-neck flask fitted with a Teflon paddle stirrer, a Y-tube fitted with a reflux condenser and an immersion thermometer. The Dry Ice-acetone cooling bath was removed, and the mixture was allowed to come to room temperature with stirring. A mixture of 10 milliliters of acetic acid and 0.2 milliliter of acetic anhydride was added, and the mixture was heated to boiling. Tert-butyl alcohol was removed through a 15-centimeter glass ring packed column. When the distillate temperature reached about 97° C. and the pot temperature was 107° C., there was added a mixture of 20.9 grams of toluene sulfonic acid monohydrate, 11 milliliters of acetic anhydride and 30 milliliters of glacial acetic acid which had been previously combined and allowed to stand at least twenty minutes. Evolution of gas started immediately and continued for about two hours, at which time essentially the theoretical amount of carbon dioxide had been measured. The cooled mixture was poured into an excess of ice cold aqueous sodium bicarbonate. The liquid phases were separated and the aqueous layer was extracted with ethyl acetate. The combined toluene and ethyl acetate extracts were washed with sodium bicarbonate, water, dried over anhydrous sodium sulfate and stripped of solvent at the water pump. The oily residue crystallized while still hot. The solid benzoylacetonitrile was pressed dry on filter paper to give 10.95 grams (75.5 percent) of product melting at 79–80° C.

Although toluene was used as the preferred solvent in the above example, other inert non-polar, non-hydroxylated organic liquids which have a boiling temperature above 100° C. may be used in lieu thereof. It is not necessary that all of the reactants be dissolved in the solvent, for they may be reacted while in suspension. The solvent should have a boiling point in excess of 100° C. in order that the tertiary butyl alcohol which is formed in the reaction, when the preferred tertiary butyl ester of cyanoacetic acid is used as starting material, can be removed by evaporation. Decarboxylation is also speeded up by high temperatures. There appears to be no upper limit on the boiling point of the solvent within practical limits. The reactions represented by Equations I, II, and III have been carried out at temperatures as low as −40° C.; and temperatures up to about 50° C. could be used, at least during part of the reaction. It is preferred that the temperature during the first stages of the reaction be less than 20° C. to avoid reaction of the by-products. For example, R″COCl tends to react with AOR′ or the ROH alcohol by-product of the first reaction illustrated above.

Any strong anhydrous acid can be used to perform the functions of the Equation IV. Ethanesulfonic acid is preferred because it is readily available. Mixed alkane-sulfonic acids may be used in lieu thereof as well as toluenesulfonic acid. Anhydrous mineral acids such as sulfuric acid, hydrobromic acid, and hydrochloric acid may also be used as the strong anhydrous acid.

A preferred embodiment of the preparation of an aliphatic beta-oxonitrile will now be given.

*Example II*

In a 5-liter, three-necked flask equipped with a Teflon paddle stirrer, a Y-tube fitted with a reflux condenser and an 11-inch stem thermometer and a 2-liter addition funnel wrapped with a heating tape, were combined 157 milliliters (1.0 mol) of methyladipyl chloride, 151 milliliters (1.05 mol) of tert.-butylcyanoacetate and 300 milliliters of toluene. To this stirred mixture was added in 30 minutes a hot solution of lithium tert.-butoxide prepared by dissolving 13.88 grams (2.0 gram atoms) of lithium wire in a mixture of 208 milliliters (2.2 mol) of tert.-butylalcohol and 1 liter of toluene. During the addition, the temperature was maintained at 5–10° C. with an ice-salt cooling bath. The cooling bath was removed and stirring was continued for one hour, after which the reaction mixture was heated with a heating mantle. When the temperature of the reaction mixture reached 45° C., 11.8 grams (1.0 equiv.) of ethanesulfonic acid was added. The reflux condenser was replaced by a 15-centimeter glass ring packed column fitted with a variable reflux take-off condenser, the gas outlet tube of which was connected to a wet testmeter through a Dry-Ice trap. Heating with stirring was continued and distillate was collected over a period of 50 minutes, by which time most of the tert.-butylalcohol had been removed and the distillate and boiler temperatures were 97° C. and 110° C. respectively. With continued refluxing and stirring 123.0 grams (1.1 equiv.) of ethanesulfonic acid was added over a period of three hours during which time about 25 liters of carbon dioxide evolved. Refluxing was continued for an additional hour and another 1.9 liters of carbon dioxide was evolved. Isobutylene collected in the Dry-Ice trap. The cooled reaction mixture was poured onto ice and 300 milliliters of ethyl acetate was then added. The liquid phases were separated and the aqueous layer was extracted once with 500 milliliters of ethyl acetate. The combined organic phases were washed with 250 milliliters of a dilute potassium bicarbonate solution, 250 milliliters of water, dried over anhydrous sodium sulfate and stripped of solvent at the water pump. The oily residue was combined with 400 milliliters of ether, seeded and allowed to crystallize in the cold room. A yield of 137 grams (74.8 percent) of product was obtained which melted at 39–40.5° C. Several recrystallizations from ether gave an analytical sample of methyl-7-cyano-6-oxoheptanoate melting at 40–41° C. Analysis calculated for $C_9H_{13}NO_3$(183.2): Carbon, 59.00; hydrogen, 7.15, nitrogen, 7.65. Found: Carbon, 58.98; hydrogen, 7.12, nitrogen, 7.57.

The product of the above reaction may be used for a number of purposes such as are referred to in United States Patent No. 2,752,375 which describes and claims the above compound and the method of preparing the same from a cyclohexene.

As will be obvious to those skilled in the art, various aliphatic and aromatic acyl halides may be used as is illustrated in Equation II above whereby beta-oxonitriles having a variety of side chains of aliphatic and aromatic nature can be prepared. In addition to the acyl halides used above, others such as acetyl, octanoyl, 1 or 2 naphthoyl, ortho, meta, or para-nitrobenzoyl chloride if used would result in beta-oxonitriles having side chains of these radicals.

We claim:

1. A method of preparing beta-oxonitriles which comprises the steps of bringing into reactive contact in a non-polar, non-hydroxylated inert organic liquid at a temperature within the range −40° C. to 50° C. a tertiary alkyl ester of cyanoacetic acid, a carboxylic acid halide and an alkali metal salt forming substance of the group consisting of alkali metal alkoxides and alkali metal hydrides.

2. A method of preparing beta-oxonitriles which comprises the steps of bringing into reactive contact in a non-polar, non-hydroxylated inert organic liquid at a temperature within the range −40° C. to 50° C. a tertiary butyl cyanoacetate, a carboxylic acid chloride, and an alkali metal tertiary butoxide.

3. A method of preparing beta-oxonitriles which comprises the steps of bringing into reactive contact in a non-polar, non-hydroxylated inert organic liquid at a temperature within the range −40° C. to 50° C. a tertiary butyl cyanoacetate, a carboxylic acid chloride and lithium tertiary butoxide.

4. A method of preparing aromatic beta-oxonitriles which comprises the steps of bringing into reactive contact in a non-polar, non-hydroxylated inert organic liquid at a temperature within the range −40° C. to 50° C. tertiary butyl cyanoacetate, benzoyl chloride and lithium tertiary butoxide.

5. A method of preparing aliphatic beta-oxonitriles which comprises the steps of bringing into reactive contact in a non-polar, non-hydroxylated inert organic liquid at a temperature within the range −40° C. to 50° C. tertiary butyl cyanoacetate, an aliphatic carboxylic acid chloride and lithium tertiary butoxide.

6. A method of preparing methyl-7-cyano-6-oxoheptanoic which comprises the steps of bringing into reactive contact in a non-polar, non-hydroxylated inert organic liquid at a temperature within the range −40° C. to 50° C. tertiary butyl cyanoacetate, methyl adipyl chloride, and lithium tertiary butoxide.

7. A method of preparing methyl-7-cyano-6-oxoheptanoic which comprises the steps of bringing into reactive contact in toluene at temperatures within the range −40° C. to 50° C. tertiary butyl cyanoacetate, methyl adipyl chloride, lithium tertiary butoxide and thereafter adding a strong anhydrous acid and heating the reaction mixture until the tertiary butyl alcohol formed during the reaction has been removed from the reaction mixture.

No references cited.